UNITED STATES PATENT OFFICE.

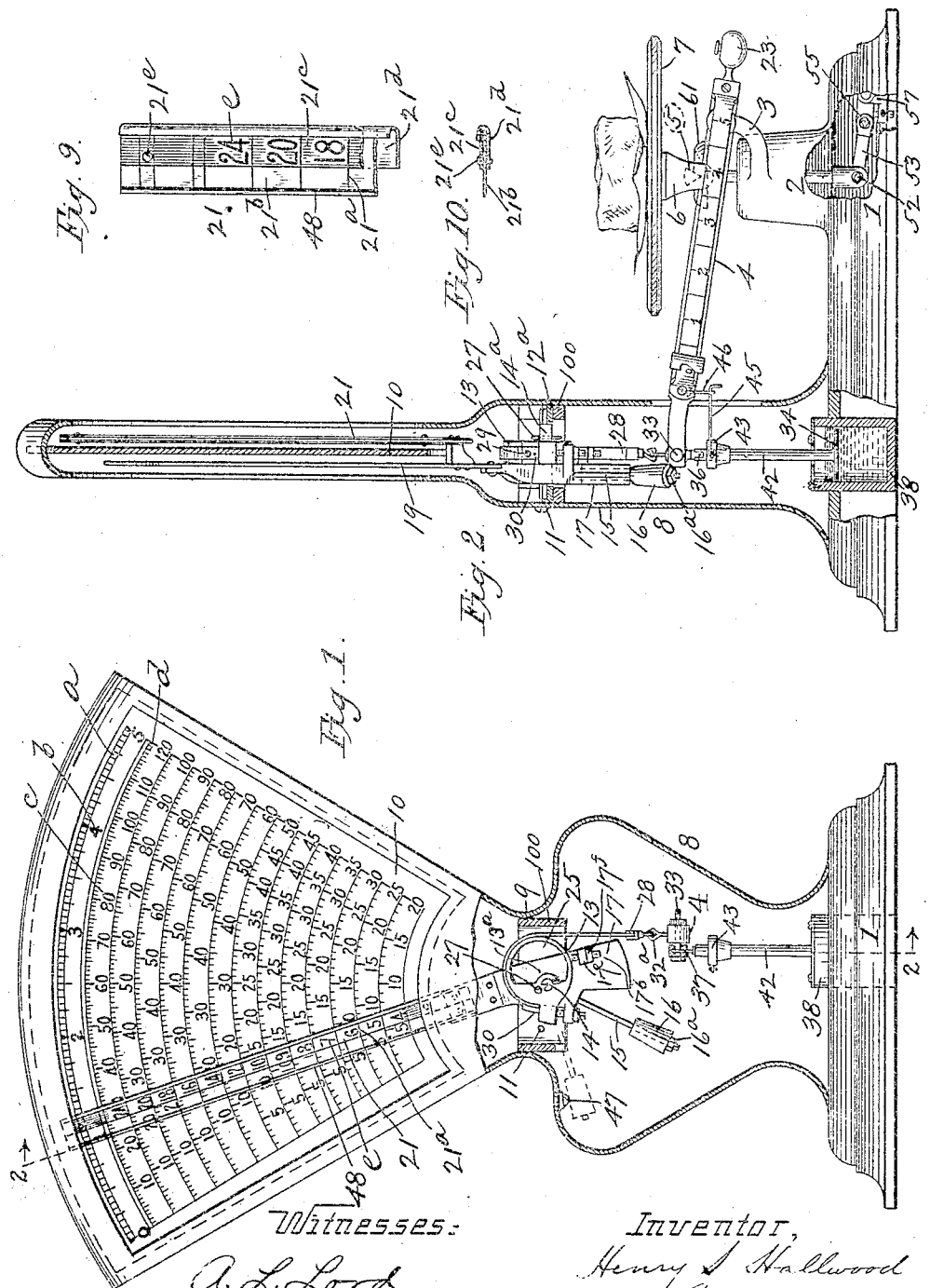

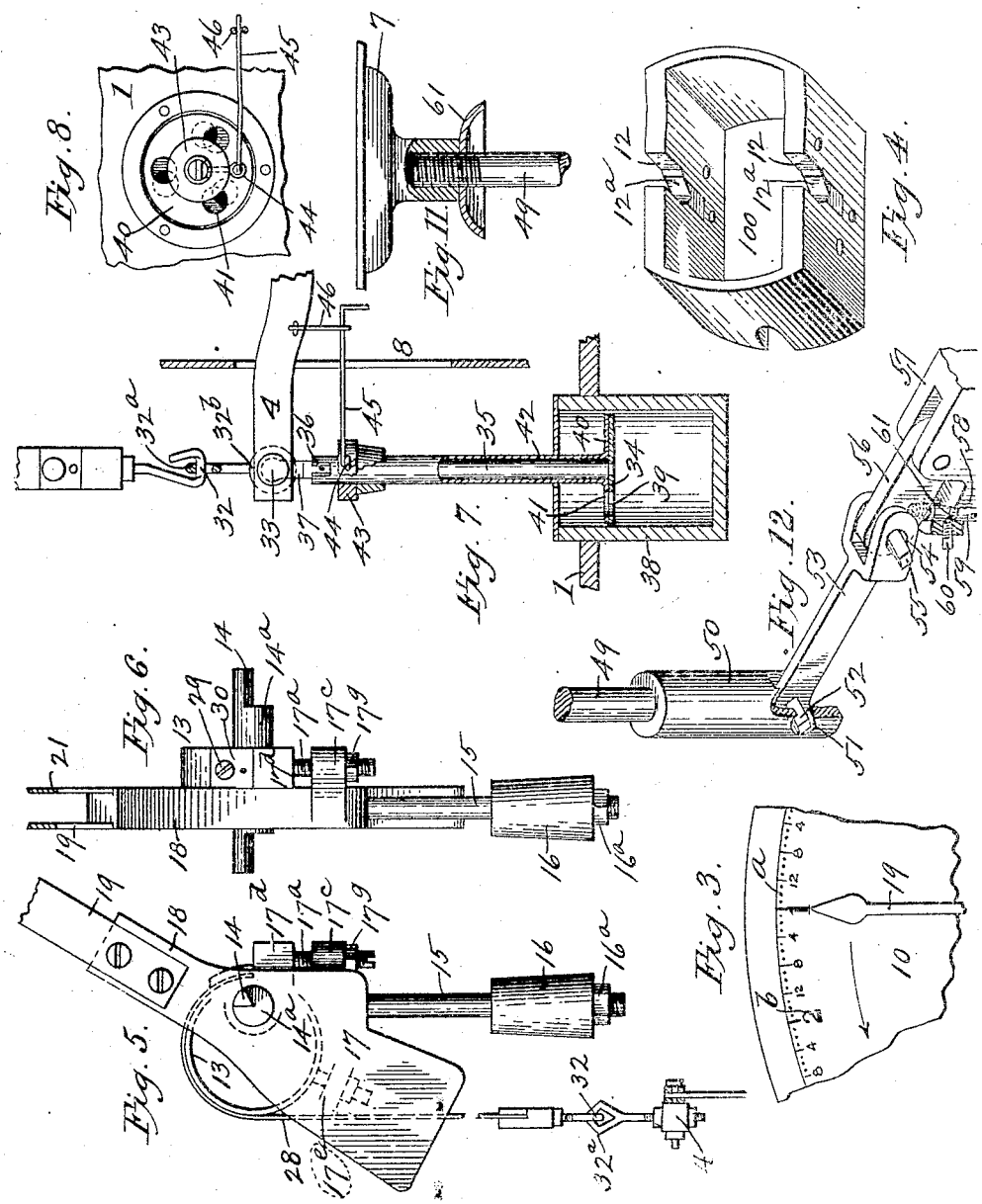

HENRY S. HALLWOOD, OF COLUMBUS, OHIO.

SCALE.

970,442.

Specification of Letters Patent. Patented Sept. 13, 1910.

Application filed June 27, 1906. Serial No. 323,553.

*To all whom it may concern:*

Be it known that I, HENRY S. HALLWOOD, residing at Columbus, in the county of Franklin and State of Ohio, have invented a certain new and useful Improvement in Scales, of which the following is a full, clear, and exact description, reference being had to the accompanying drawings.

My invention relates to pendulum computing scales and has for its object to improve and simplify the construction thereof. In the operation of such scales as are provided with an index hand movable across the face of a chart having thereon numerals indicating the weight and values of commodities at different prices per pound (or other unit of weight) much inconvenience and loss of time have been occasioned by reason of the fact that the index hand covers the desired graduations and numerals in advance of the registering of the reading edge of the hand with the same. As a result, the operator generally places on the scale pan a greater quantity of the commodity than is necessary and then brings the index hand to the desired position by removing a portion of the commodity from the pan. Furthermore, the index hand, in many positions, covers up the nearest numeral-provided graduation and, in order to ascertain what value of the commodity is represented by the quantity on the scale pan, it is necessary to take a numeral and a graduation a considerable distance from the index and count from such numeral and graduation to the index, whereas, if the nearest numeral-provided graduation were not concealed by the index hand, the value of the commodity on the scale could be read at a glance.

The object of my invention is to provide a construction which will eliminate the objections above noted.

Further objects of the invention are to provide simple and effective means for ascertaining at a glance, the desired computation numeral on the chart; to provide novel and effective means for supporting the rotary drum which carries the index hand; to provide a novel form of said drum; to provide an improved construction of dashpot; to provide improved means for supporting the lower end of the stem or post which carries the scale pan or platform; and, generally, to improve the efficiency of scales of this type.

Referring to the drawings forming part hereof, Figure 1 represents an end elevation of a scale built in accordance with my invention, the casing and part of the frame being broken away to illustrate the drum and the manner of supporting the index-carrying arm; Fig. 2 represents a vertical sectional view on the correspondingly numbered line of Fig. 1; Fig. 3 represents a detail of the back or reverse side of the chart, showing the arm which indicates to the customer the weight of the article; Fig. 4 represents a perspective view of the frame which supports the drum; Fig. 5 represents an enlarged elevational detail of the drum, showing the manner in which the index and the weight pendulum are supported thereby, said view showing the reverse side of the drum shown in Fig. 1; Fig. 6 represents a similar view of said drum, taken at right angles to Fig. 5; Fig. 7 represents a sectional detail of the dashpot, the end of the scale beam and certain other parts being shown in elevation; Fig. 8 represents a detail in plan of said dashpot; Fig. 9 represents an enlarged detail of the operator's index hand; Fig. 10 represents an enlarged sectional detail of said hand; Fig. 11 represents a detail of the stem or post which carries the scale pan or platform, the scale pan or platform in this view being of slightly different contour from that shown in Fig. 2; and Fig. 12 represents a detail of the link which supports the lower end of the said stem or post.

Describing the parts by reference numerals, 1 represents the base of the platform or scale. The base supports at one end the pillar 2 which carries brackets 3 to which are pivoted the branches of the scale beam 4, the upper edges of said branches being provided with the usual agate bearings for receiving the knife blade pivots 5 carried by brackets 6 which depend from the scale pan or platform 7.

At the opposite end of the platform is supported the casing 8 within which the chart, drum, movable index and dashpot are located. As will appear from Fig. 1, the lower part of the casing is enlarged laterally to provide a space within which the pendulum may swing. Above this enlarged space, it is contracted inwardly at 9, whence it is again enlarged laterally to provide room for the accommodation of the chart 10. Within the contracted portion or neck 9 is supported a frame 100, which is of suitable shape to be embraced by the said contracted portion of the casing, being secured thereto, as by screws 11. This frame is preferably of cast metal and is provided with oppositely arranged stepped recesses 12. Within the lower portions of these recesses are forced the bearings 12ª. These bearings are preferably of steel or agate and are of a length equal to the width of the lower portions of the recesses 12, being preferably bedded in cement whereby they are firmly retained in place. The drum 13 is supported by said bearings through knife edge pivots 14 projecting therefrom. These pivots are arranged eccentrically of the drum, in order that I may employ therewith a chart the graduations of which are uniformly spaced. Projecting from the drum is a pendulum rod 15 having thereon a weight 16. This weight or pendulum may be slidable on said rod and is adjusted thereon by means of a nut 16ª, as shown in Figs. 5 and 6. As previously stated, the drum also carries the index hand and arm by which the operator and purchaser may read their respective sides of the chart. A very effective form of support for said hand and arm and for the pendulum 16 consists of the carrier 17 which is preferably a casting crossing the drum, the upper portion 18 extending above the drum and providing a support for the arm 19 and index 21. The lower portion of said carrier casting is enlarged and projects considerably below the drum, in substantial alinement with the upper portion and the arm 19 carried thereby, to counterbalance said arm and the index 21. The carrier is adjustably connected to the drum by means of screws 17ª, 17ᵇ, the former of which projects through a lug 17ᶜ of the carrier and engages a lug 17ᵈ on the drum and the latter of which projects through a lug 17ᵉ on the carrier and engages the adjacent surface of the drum. It will be seen that these screws are on opposite sides of the knife edge pivots 14, enabling the index 19 to be adjusted by simply loosening one of said screws and setting up on the other. Jam nuts 17ᶠ, 17ᵍ retain the parts in adjusted position. To bring the index hands to zero, shot or similar finely divided material is placed in the receptacle 23 supported by the ends of the scale beam branches. By the use of such material, the indicating hands may be set approximately to zero position, after which the adjusting screws 17ª, 17ᵇ may be manipulated to complete the adjustment.

The carrier casting is conveniently secured to the drum by means of the shaft 14ª which carries the knife edge pivots, and by means of a cotter pin 27 extending through the shaft 14ª, the drum is prevented from slipping sidewise on the shaft.

As will appear more particularly from Figs. 1 and 5, the drum is a ring having an inwardly directed projection 13ª extending from one side thereof into the body of the drum and provided with an aperture, eccentric of the drum, for the shaft 14ª.

The inner end of the scale beam 4 is connected to the drum by means of a flexible connection, as a metal tape 28, one end of which is adjustably secured to the drum by means of a screw 29 extending through a plate 30 and through the end of the tape and into the drum. The inner surface of said plate is concave to correspond to the contour of the drum. The other end of the tape may be connected to the scale beam by means of a link 32, the upper edge of which is provided with a knife-edge pivot, as indicated in Fig. 7. The upper edge of the pivot engages a V bearing in a link or eye bolt 32ª near the end of the beam 4, said link or eye-beam being supported by a sleeve 32ᵇ on a bolt 33 projecting from the end portion of said beam. In practice the dashpot is located forward of the bolt 32ª so that the bolts will not intersect.

To reduce the vibrations of the parts to a minimum, thereby permitting quick and accurate reading of the scale, I connect the drum, through the scale beam, with a dashpot. This dashpot is of the liquid type and comprises a piston 34 carried by a rod 35 which is pivotally supported at 36 from a link 37 suspended from the bolt 33. The piston fits more or less closely within the cylinder 38, which is preferably supported partly above and partly below the top of the base 1. This piston is provided with several perforations 39 controlled by a valve 40, said valve being a rotary disk mounted on the upper surface of the piston and provided with perforations 41 corresponding to the perforations of the piston. By adjusting the disk relatively to the piston, the effective area of the perforations in the latter may be adjusted to secure the desired rate of flow of the oil or other liquid from side to side of the piston, with the view of bringing the parts quickly to rest at the time of placing an article on the platform to be weighed and of removing an article therefrom after having been weighed.

The disk 40 is preferably formed integral with a hollow stem 42 surrounding the rod 35, said stem being provided with a ring 43, rigid therewith and having an eye 44 adapted to be engaged by a hook on one end of a rod 45, the other end of said rod projecting through the casing 8 and being supported in convenient position for manipulation by means of a hook 46 carried by the scale beam. The construction described affords a simple and convenient means whereby the rate of flow of liquid through the piston may be controlled by an adjusting device extending outside of the casing and convenient of access to the operator.

A small bumper 47 is carried by the upper portion of the enlargement of the casing hereinbefore described, the frame 100 being slotted at the lower edge to permit the passage of the rod 15. The purpose of this bumper is to engage the weight 16 at the upper limit of its movement and thus, with the dashpot, protect the parts from jar and shock when a weight of commodity considerably in excess of the capacity of the scale is placed on the pan.

The upper or chart-receiving portion of the casing is substantially open, front and back, and there is secured within the same, in any suitable manner, the chart or table 10 hereinbefore referred to. This chart is provided, near the upper periphery and on both sides thereof, with a series of graduations $a$ indicating ounces and a corresponding series of numerals $b$ indicating pounds. In the drawing, I have shown a five-pound chart, for clearness of illustration, although it will be apparent that a chart having a larger capacity may be employed. This chart is provided with concentric series of graduations, the graduations of each series indicating the values of different commodities at different prices per pound (or other unit of weight.) At convenient intervals, each series of graduations is provided with numerals $c$ indicating the total values of commodities at different prices per pound (or other unit of weight). For instance, the outer arc $d$ is provided with series of graduations corresponding to twenty-four cents per pound. The arc corresponding to this rate is divided into a convenient number of graduations representing a convenient fractional part of the price per pound. For clearness of illustration, I have shown the arc $d$ as divided into one hundred-twenty equal parts, each division representing a value of one cent. With these graduations I prefer to place the figures representing the values at such places as will enable me to use multiples of 5 for convenience of reading. In the same manner, each other series of graduations is provided with suitable numerals indicating the values of commodities at different prices per pound, the same principle being followed as to dividing the arc and applying numerals thereto which has been set forth in connection with the first series of graduation. In order to facilitate the reading of the weight, price per pound, and value of any commodity, I employ with such chart the index hands 19 and 21 suitably secured to the casting 17 and extending across the face of the chart, as indicated more particularly in Figs. 1, 2, 3, 9, and 10. The hand 19, being on the customer's side of the chart, coöperates with a scale indicating weight only.

The right hand side of the operator's index hand is opaque, the opaque side being preferably white in color and having numerals $e$ thereon which are preferably red to present a strong contrast against the opaque background. The left-hand side of the index hand is transparent and carries, near the edge thereof, a reading line 48, which coincides in direction with a line drawn from the knife edge pivot. The numerals $e$ are placed on the same arcs as the computation numerals on the chart which represent total values of commodities at the prices per pound represented by such numerals $e$. To facilitate reading, I provide the index hand 21 with concentric arcs $21^a$ which are described from the knife-edge pivot 14 as a center, with the same radii as the arcs on the chart. This confines the vision to the computation figures and price figures between coincident arcs, or, in other words, the concentric lines on the index hand direct the eye between the coöperating arc lines upon the chart. In actual practice, I have made the transparent portion of the hand about one quarter an inch wide and the opaque portion somewhat wider, with the reading line about one sixteenth of an inch from the left hand edge of the hand. This reading line may be red or of any color which will afford contrast against the face of the chart. While the index hand 21 may be of a single piece of celluloid or other transparent material, to afford stiffness and prevent warping I prefer to construct it in the manner shown in Figs. 9 and 10, wherein $21^b$ represents the transparent celluloid, on the front of and at one side of which is the opaque celluloid $21^c$, which carries the numerals. A thin steel plate $21^d$ embraces the portion of the transparent celluloid which is beneath the opaque celluloid and is bent around and embraces the right hand edge of the latter. Rivets $21^e$ secure the left hand edges of the steel plate and opaque celluloid to the transparent celluloid.

By the above arrangement and construction of index hand and chart, quick and accurate reading of the same is obtained. For instance, as shown in the drawing, the index hand has completely covered the numeral 5, which indicates the value of a commodity at four cents per pound, and has partly covered other numerals on the chart. The numeral 4, which is on the index hand, is directly opposite the numeral 5, but, being of contrasting color, is easily distinguished therefrom. In order to read the value of the commodity, it is not necessary for the operator to begin at the left hand of the arc and count the graduations to the point of intersection of the reading line of the index hand with such arc, but he can see at a glance that the value of the commodity is less than one graduation removed from the numeral 5, which numeral is the one nearest to the reading line or edge of the index hand, while the numeral 5 belonging to the arc above is partly covered by the index hand, but it is not hidden thereby. Under the ordinary index hand, the numeral 5 in the arc first described would be entirely concealed, while the numeral 5 in the arc next beyond would be partly concealed. With my construction, however, the computation on the chart is always visible and is readily compared with the numerals indicating rate per pound on the index hand. Another advantage of this construction is that the price per pound and the reading line of the index hand are so close together that it is impossible to make any mistake in reading the desired graduation. Moreover, the graduations do not have to be inspected through contracted notches in the index hand, as is the case in the types of scales generally on the market. In a chart such as is actually used on scales, a far greater number of numerals appears than is shown in the drawings, and more numerals will be entirely or partly covered by the index hand than is disclosed in the drawings, wherein, owing to the reduced scale on which the parts are represented, only sufficient numerals, arcs and graduations appear to illustrate the principle of my invention and to make clear the advantages which flow from the construction of the index hand and the arrangement of the numerals thereon.

In Figs. 2 and 12 there is illustrated a construction whereby the stem or rod which supports the scale pan or platform is kept vertical during a weighing operation. The lower end of the stem or rod 49 carries a sleeve 50 threaded thereonto and having in its lower portion oppositely located holes 51 to form bearings for a double knife-edge pivot 52 carried by one end of a link 53. The other end of link 53 is bifurcated or forked and the forks are each provided with a hole 54 for the reception of a similar double knife-edge pivot 55 carried at one end of a link 56. The other end of link 56 is pivoted in a bracket 57 which is secured to the scale base. This bracket has a projection 58 on its under side extending beneath the link 56 and is provided with a screw 59 the upper end of which is threaded into the lower portion of said link. By turning this screw, the link 56 is raised or lowered, the screw being held from endwise movement as by means of a screw 60 engaging a score 61 in the body thereof. The knife-edges 52 and 55 are of the same width and, one being fixed in the link while the other is fixed in the bracket, the alternate push and pull on the link is transmitted to corresponding sides of the knife-edges, thereby preserving the length between the bearings.

It frequently happens, in the operation of scales, that liquids run down the stem or rod 59 onto the pivotal connection between the lower end thereof and the links which maintain the stem vertical during a weighing operation. To prevent this, I provide an inverted cup-shaped washer 61 which may be threaded onto the stem 49 below the point at which the latter is threaded into the spider or carrier for the scale pan or platform 7. Any liquid which may drop upon 61 is carried outwardly to the edges thereof, whence it may drop onto the top of the pillar 2 and run down the outside of the same without entering the interior of the casing. Furthermore, this cup, by being threaded on the stem, serves another function, viz: to act as a lock-nut to lock the stem or rod 59 and the scale pan together.

Having thus described my invention what I claim as new and desire to secure by Letters Patent is:

1. In a computing scale, the combination of a chart member having thereon numerals indicating the values of commodities at different prices per unit weight, of a rate member having transparent material provided with a distinct reading line near one edge thereof and having numerals adjacent the other edge indicating the price per unit weight of such commodities, and a scale pan or receptacle operatively connected with one of said members, substantially as specified.

2. In a computing scale, the combination of a scale beam, of a rotary drum operatively connected with said beam, a chart having on its rear face a series of graduations and numerals indicating weight and on its front face a series of graduations and numerals indicating the values of commodities at different prices per pound, of an arm carried by said drum and extending across the rear face of said chart, and an index hand carried by said arm and having a transparent portion adjacent to a longitudinal edge thereof and extending in front of said chart, said hand being provided with numerals indicating prices per pound of such commodities, substantially as specified.

3. In a scale, the combination of a chart having numerals and graduations thereon, an indicating member movable across said chart and having a transparent portion and an opaque portion provided with numerals, the transparent portion being provided with a reading line near an edge thereof, substantially as specified.

4. In a computing scale, the combination of a chart member having thereon numerals indicating the values of commodities at different prices per unit weight, an indicating member having one side thereof transparent and the other side opaque and provided with numerals indicating the prices per unit weight of such commodities and having the first-mentioned side provided adjacent its edge with a reading line, and a support for commodities operatively connected with one of said members, substantially as specified.

5. In a computing scale, the combination of a chart member having thereon numerals indicating the values of commodities at different prices per unit weight, an indicating member having one side thereof transparent and the other side opaque and provided with numerals indicating the prices per unit weight of such commodities, the transparent side being provided near the edge thereof with a reading line, and a support for such commodities operatively connected with one of said members, the numerals on said members being arranged so that those on one member will register with those on the other member when brought into juxtaposition, substantially as specified.

6. In a scale, the combination of a casing, a chart member therein, of a rotary drum by which one of said members is carried, said drum having knife edge pivots, and an open frame for supporting said drum, said frame extending transversely of said casing and being secured thereto, said frame having bearings for the said pivots, substantially as specified.

7. In a scale, the combination of a casing having an enlarged base and a contracted portion above such base, a frame detachably supported within the contracted portion of the casing and having bearings therein, a drum provided with pivots engaging said bearings, an index carried by said drum, a chart with which said index coöperates, and a pendulum projecting from said drum into the enlarged portion of the casing, substantially as specified.

8. In a scale, the combination of a fixed and a rotatable indicating member, a rotary drum, a carrier for the rotatable member, said carrier having an arm projecting above said drum and a counterbalance extension projecting below said drum, and means for adjustably securing said carrier to said drum, substantially as specified.

9. In a scale, the combination of a fixed and a rotatable indicating member, a rotary drum for the latter member, a carrier for said rotatable member extending across said drum and secured thereto, said carrier having an arm by which the rotatable member is carried and an extension projecting below said drum to counterbalance said rotatable indicating member, and means for adjusting the position of said carrier with respect to said drum, substantially as specified.

10. In a pendulum computing scale, the combination of a fixed and a rotatable indicating member, a rotary drum for the latter member, a scale beam, a connection between said scale beam and said drum, a counterbalance for said rotatable member comprising a downwardly extending arm, a weight pendulum carried by such counterbalance, and means for adjusting the counterbalance relatively to the drum pivot, substantially as specified.

11. In a pendulum computing scale, the combination of a fixed and a rotatable indicating member, a rotary drum, a carrier for said rotatable member having an arm projecting above the drum and supporting the rotatable member and a counterbalance extension projecting below the drum, a pendulum carried by said carrier, a scale beam connected to said drum, and means for adjusting the position of said carrier with respect to the drum pivot, substantially as specified.

12. In a computing scale, the combination of a casing having an enlarged base and a contracted portion above said base, a frame supported within the contracted portion of the casing and having bearings therein, a drum provided with pivots engaging said bearings, a pendulum projecting from said drum into the enlarged portion of the casing, a bumper in said casing positioned to receive the impact of the pendulum at the end of the stroke thereof, the frame being provided with a recess in the lower edge thereof to permit the engagement of the pendulum with the bumper, substantially as specified.

13. The combination of a casing, a scale beam projecting into said casing, a dashpot in said casing having a piston connected to said beam, said piston being provided with a perforation, a valve for said perforation, and means, extending outside the casing, for operating said valve, substantially as specified.

14. The combination of a casing, a dashpot in said casing comprising a cylinder member and a piston member, a scale beam extending into the casing and connected to one of said members, the piston being constructed to permit the flow of fluid from one side thereof to the other, and means extending outside the casing for controlling the rate of such flow of the fluid, substantially as specified.

15. The combination of a casing, a dashpot in said casing comprising a cylinder member and a piston member, a scale beam extending into the casing and connected to one of said members, the piston being constructed to permit the flow of fluid from one side thereof to the other, and means extending outside the casing and supported by the scale beam for controlling the rate of flow of such fluid, substantially as specified.

16. The combination of a casing, a dashpot therein comprising a cylinder and a perforated piston, a scale beam extending into said casing and connected to said piston, a perforated rotary disk coöperating with said piston, and means for operating said disk, said means extending outside the casing, substantially as specified.

17. The combination of a casing, a dashpot therein comprising a cylinder and a perforated piston, a perforated rotary disk coöperating with said piston, a scale beam extending into said casing and connected to said piston and means for operating said disk, said means extending outside the casing and being supported from the scale beam, substantially as specified.

18. The combination of a casing, a dashpot therein comprising a cylinder and a perforated piston, said piston having a rod, a scale beam projecting into the casing and connected to said rod, a perforated rotary disk coöperating with the piston and having a hollow operating stem surrounding the piston rod, and an operating rod extending outside of the casing and connected to said stem, substantially as specified.

19. The combination of a casing, a dashpot therein comprising a cylinder and a perforated piston, said piston having a rod, a scale beam projecting into the casing and connected to said rod, a perforated rotary disk coöperating with the piston and having a hollow operating stem surrounding the piston rod, an operating rod connected to said stem and projecting outside said casing, and means for supporting the said rod from said beam, substantially as specified.

20. In a scale, the combination of a chart having numerals and graduations thereon, and an index hand movable across said chart, said index hand comprising a base member of transparent material having adjacent one edge thereof a reading line, an opaque member adjacent the other edge of said base member and having numerals thereon, and means for clamping said members together, substantially as specified.

21. In a scale, the combination of a chart having numerals thereon, of an index hand movable across said chart, said index hand comprising a transparent member having means for indicating with the numerals on the chart the value of a commodity, an opaque member adjacent one side of said transparent member and having price numerals thereon, and a backing extending around an edge of the opaque member and beneath a portion of the transparent member, and means for securing said backing member to said transparent member, substantially as specified.

22. In a scale, the combination of a scale beam, an index, a drum for rotating said index, a flexible band or tape operatively connected to said drum, and means for connecting said band or tape to said scale beam, said means comprising a pair of links one of which has a knife edge pivot and the other of which has a substantially V-shaped bearing or seat therefor, substantially as specified.

23. In a scale, the combination of a scale pan or platform, a spider or support therefor, a rod or stem extending therefrom, said rod or stem being threaded into the scale pan support, and an inverted cup threaded on said stem below the point of attachment of the scale pan support thereto, substantially as specified.

24. In a scale, the combination of a scale pan or platform, a base, a threaded rod or stem extending from said pan into said base, and an inverted cup threaded on said stem above said base and locking the stem to the pan or platform, substantially as specified.

25. The combination, with the base of a scale, of a rod or stem extending thereinto and supporting at its upper end the scale pan or platform, a link in said base pivotally connected with said stem or rod, and an inverted cup threaded on said rod for locking the pan or platform thereto and preventing access of liquid from the scale pan to the point of connection of said link with said rod or stem, substantially as specified.

26. The combination, with the base of a scale, of a stem or rod for supporting the scale pan, and means for maintaining said stem in a vertical position during a weighing operation, said means comprising a pair of links, one of said links being pivotally connected to said stem and to the other link at one end thereof, a bracket pivotally supporting the other end of the latter link and means for vertically adjusting the latter link, said means comprising a lug or arm projecting from the bracket and a screw extending through said lug or arm and threaded into said link, substantially as specified.

27. In a scale, the combination of a stem or rod for supporting the scale pan, means for maintaining the same vertical during a weighing operation, said means comprising a sleeve at the lower end of the stem or rod, said sleeve having bearings therein, a link provided with knife-edge pivots mounted in said bearings, a second link pivoted in like manner to the first link, and means for adjusting the position of the second link, substantially as specified.

28. In a scale, the combination of a stem or rod for supporting the scale pan, means for maintaining said stem or rod vertical during a weighing operation, said means comprising a sleeve carried by the lower end of said stem or rod, said sleeve having oppositely located bearings therein, a link having one end projecting into the sleeve and provided with knife edge pivots fitted in said bearings, said link having its opposite end bifurcated and provided with oppositely arranged bearings in such bifurcated portion, a second link projecting into the bifurcated end of the first link and having knife edge pivots engaging the bearings thereof, a pivotal support for the other end of the last mentioned link, and means engaging said link intermediate the ends thereof for vertical adjustment thereof, substantially as specified.

29. In a scale, the combination of a fixed and a rotatable indicating member, a rotary drum for the latter member, a carrier for said rotatable member secured to said drum, a scale beam, a flexible band or tape connected to said scale beam and extending over the top of the drum and secured thereto, a lug projecting from the drum, a lug projecting from the carrier, and a screw extending through one of said lugs and engaging the other, substantially as specified.

30. In a scale, the combination of a rotary drum, said drum comprising a ring having a projection extending inwardly from one portion thereof and provided with a transverse aperture eccentric to said drum, an indicating member carried by said drum, a pivot shaft extending through the aperture, a scale beam, and a connection between said beam and drum, substantially as specified.

In testimony whereof, I hereunto affix my signature in the presence of two witnesses.

HENRY S. HALLWOOD.

Witnesses:
G. M. GRIDLEY,
M. B. SCHLEY.